Oct. 15, 1940.  F. MÜLLNER  2,218,433

MIXING DEVICE

Filed April 29, 1940

Inventor:
Friedrich Müllner,
by Harry E. Dunham
His Attorney.

Patented Oct. 15, 1940

2,218,433

UNITED STATES PATENT OFFICE 2,218,433

MIXING DEVICE

Friedrich Müllner, Berlin, Germany, assignor to General Electric Company, a corporation of New York Application April 29, 1940, Serial No. 332,356
In Germany March 24, 1939

5 Claims. (Cl. 259—84)

This invention relates to mixing devices, more particularly to food mixing devices, and it has for its object the provision of an improved device of this character.

For beating the whites of eggs, cream, mayonnaise and similar delicacies, beaters are generally used which consist of wires or bands joined together to form an open-work basket. These arrangements, however, are better adapted for beating and stirring light substances than thick liquid substances. If they are used for making dough for pastry, they require considerable power to operate them. Furthermore, at times it is troublesome to remove the paste from the basket-like structures when the mixing operation has been completed. The known beaters consisting of metal can also be very easily damaged if attempts are made to scrape off the adhering paste with a hard object, for example, a spoon during the stirring process.

This invention contemplates an improved mixing device which is suitable for mixing all kinds of foods, whether light or heavy, and which avoids the drawbacks mentioned above. In one form, the food-working device of this invention comprises a beating element having beating surfaces formed of an elastic material, such as rubber. Preferably, a beater element will be arranged to rotate adjacent a wall of the mixing bowl so as to tend to rotate the bowl by the action of the beater on the material in the bowl. The outer edges of the beater element which sweep adjacent the bowl wall preferably will be formed of a resilient yielding material of very thin section so that the edges will yield in the event a heavy particle of food or other heavy or rigid object tends to become wedged between the beater and the wall. Also, the outer flexible edges of the beater yield when in heavy materials to reduce the load imposed on the driving motor.

Figure 1:
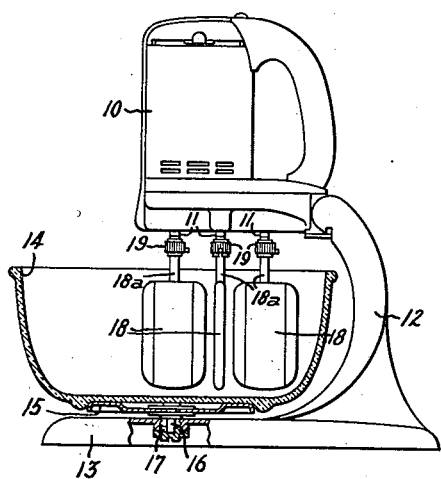
Figure 2:
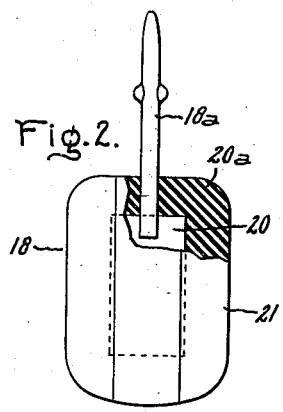
Figure 3:
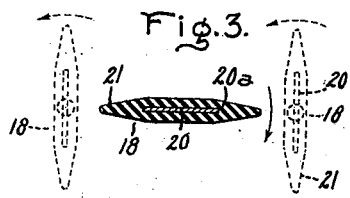
Figure 4:
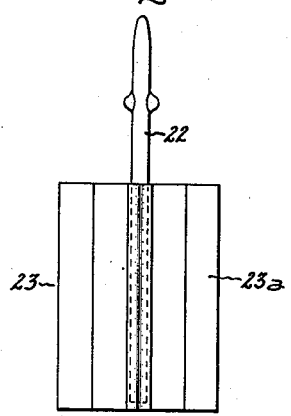
Figure 5:
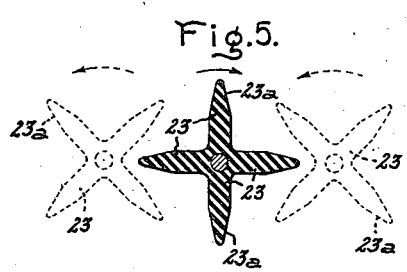
Figure 6:
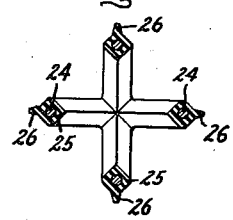
Figure 7:
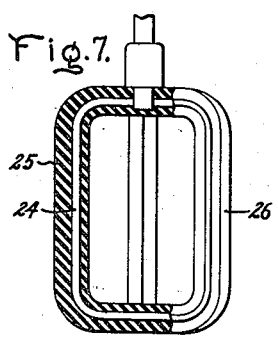

For a more complete understanding of this invention, reference should be had to the accompanying drawing in which Fig. 1 is an elevation, partly in section, of a food mixing device embodying this invention; Fig. 2 is an enlarged elevation of a food beating element arranged in accordance with this invention, parts being broken away so as to illustrate certain details of construction; Fig. 3 is a diagrammatic view illustrating the relationship of the beaters as used in the mixing device of Fig. 1, one of the elements being shown in section so as to illustrate certain details of construction; Figs. 4 and 5 are views similar to Figs. 2 and 3 respectively, but illustrate a modified form of this invention; Fig. 6 is a horizontal sectional view of another form of beater arranged in accordance with this invention; and Fig. 7 is an elevation of the beater element of Fig. 6.

Referring to the drawing, this invention has been shown as applied to a mixing device comprising a power unit 10 which is arranged to drive a plurality of beater driving shafts 11. As shown, three shafts 11 are provided in spaced-apart parallel relation. The power unit 10 is mounted on a standard 12 which in turn is supported on a base 13. It will be observed that the power unit 10 is supported on the standard 12 so as to overhang the base 13. Supported on the base 13 under the over-hanging power unit 10 is a suitable mixing bowl 14. Preferably, the bowl 14 will be mounted for rotation on the base. For this purpose, a turn-table 15 is provided to support the bowl. The turn-table 15 is provided with a shaft 16 which supports the turn-table for rotary motion in a suitable socket 17.

The shafts 11 are arranged to support suitable beating elements 18 and to drive adjacent beating elements in opposite directions, as shown in Fig. 3. Each beater is provided with a supporting shaft 18a which is arranged to have a driving connection with the power unit shafts 11. Suitable coupling means 19 are provided for attaching the beater element shafts 18a to the driving shafts 11.

The driving shafts 11 are so related to the axis of rotation of the bowl 14 that the inside beater element, that is, the right-hand beater element as viewed in Fig. 1, is adjacent the side wall of the bowl so that it tends to rotate the bowl by the action of the beater on the material in the bowl.

Each beater element 18, as shown in Figs. 1, 2 and 3, is of spade-like form. As shown, it is provided with a spade-like rigid core 20 which preferably will be formed of metal. This core 20 is provided with a covering 20a formed of a flexible yielding material, such as rubber. The rubber covering may be provided by vulcanizing the edges of a pair of similar rubber plates over the spade-like core.

The outer edges 21 of the covering taper downwardly to a thin edge, as shown in Fig. 3, so that the edges are quite flexible and yielding. This is of advantage in that the edges yield in the event of the jamming of a solid object or a hard particle of food between the beater element and the bowl wall. Also they yield in the event a hard object, such as a spoon, is brought into contact with them. In addition, they yield somewhat in heavy batters and mixtures so as to reduce the load imposed on the driving element 10.

It will be understood that the shaft 18a will be rigidly secured to the spade-like core 20.

In Figs. 4 and 5, there is shown a modified form of this invention in which the beating blades form a cruciform cross section. Here the driving shaft 22 has formed on its lower ends flexible blades 23, as shown in Fig. 5 so as to define the cruciform cross section. Here the three beater elements are rotated to mesh with each other somewhat like a toothed wheel. Here also, it will be observed that the outer edges 23a of the blades taper downwardly to thin flexible sections.

In the form of this invention shown in Figs. 6 and 7, the beater has a shape somewhat like the conventional basket-like beater structures. Here, however, a series of metallic or rigid arms 24 are provided as a core supporting structure for a flexible covering 25. Here also, the outer edges of the covering 25 on each of the arms is tapered outwardly to a thin section 25. These sections, as in the other forms, are quite flexible and yielding to prevent jamming of the beater and injury to the beater in the event a solid object is brought into contact with it.

In each case, it will be observed that the yieldable coating can be readily cleaned.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A food beater element for a food working device wherein the beater element is rotated in a rotatable food-mixing bowl adjacent a wall of the bowl so that it tends to rotate the bowl by the action on the material in the bowl, comprising a rigid supporting member having yielding edges tapering to a thin flexible section that yield should they engage the wall of the bowl, or in case a solid particle should tend to become jammed between the beater and the wall.

2. A food beater element for a power-driven food working device wherein the beater element is rotated by a power-driven shaft in a rotatable food mixing bowl adjacent a wall of the bowl so that it tends to rotate the bowl by its action on the material in the bowl, comprising a rigid supporting member adapted to be rotated by the shaft, and a yieldable coating covering the said supporting member and having outer edges that sweep close to the wall as said supporting member is rotated, said edges tapering to a thin flexible section so that they will yield should they engage the wall or in case a solid particle be jammed between the beater and the wall.

3. In a food working device having a mixing bowl and a drive shaft, a beater adapted to be rotated by said shaft in said bowl adjacent a wall thereof, said beater provided with a rigid supporting member adapted to be connected to and driven by said shaft, and a yieldable coating covering said supporting member and having outer edges that sweep close to said wall, said edges tapering to a thin flexible section so that the coating will yield should it engage the wall, or in case a solid object be jammed between the beater and the wall.

4. In a food mixing device, a beater element having a rigid core of spade-like form and a yieldable covering over said core having its opposite edges tapering outwardly to thin highly flexible sections.

5. In a food working device, a beater element having a cruciform cross section and formed of a flexible yieldable material, the outer edges of each arm of said section tapering outwardly to a thin highly flexible section.

FRIEDRICH MÜLLNER.

CERTIFICATE OF CORRECTION.

Patent No. 2,218,433. October 15, 1940.

FRIEDRICH MÜLLNER.

It is hereby certified that error appears in the printed specification of the above numbered patent requiring correction as follows: Page 2, first column, line 20, for "section 25" read --section 26--; and second column, line 19, beginning with "3. In a food" strike out all to and including "wall." in line 30, comprising claim 3, and for the claims now appearing as 4 and 5, read 3 and 4 respectively; and that the said Letters Patent should be read with this correction therein that the same may conform to the record of the case in the Patent Office.

Signed and sealed this 10th day of December, A. D. 1940.

(Seal)

Henry Van Arsdale,
Acting Commissioner of Patents.